United States Patent
Gao

(10) Patent No.: US 11,627,489 B2
(45) Date of Patent: Apr. 11, 2023

(54) METHOD, APPARATUS AND STORAGE MEDIUM FOR CONTROLLING NETWORK CONNECTION

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/358,205

(22) Filed: Jun. 25, 2021

(65) Prior Publication Data
US 2022/0286902 A1     Sep. 8, 2022

(30) Foreign Application Priority Data

Mar. 3, 2021  (CN) .......................... 202110253136.3

(51) Int. Cl.
*H04W 28/02*  (2009.01)
*H04W 76/25*  (2018.01)
(Continued)

(52) U.S. Cl.
CPC ....... *H04W 28/0289* (2013.01); *H04W 24/06* (2013.01); *H04W 76/19* (2018.02); *H04W 76/25* (2018.02)

(58) Field of Classification Search
CPC . H04W 28/0289; H04W 24/06; H04W 76/00; H04W 76/19; H04W 76/20; H04W 76/25
See application file for complete search history.

(56) References Cited

U.S. PATENT DOCUMENTS

| | | | |
|---|---|---|---|
| 11,265,751 B1 * | 3/2022 | Marupaduga | H04W 28/0252 |
| 2022/0046738 A1 * | 2/2022 | Challa | H04W 56/001 |
| 2022/0086689 A1 * | 3/2022 | Abdel Shahid | H04W 76/15 |

FOREIGN PATENT DOCUMENTS

| | | |
|---|---|---|
| CN | 108401512 A | 8/2018 |
| CN | 110784898 A | 2/2020 |

(Continued)

OTHER PUBLICATIONS

English Translation of WO 2021052014 to Lin et al, published Mar. 25, 2021. (Year: 2021).*

(Continued)

*Primary Examiner* — Robert C Scheibel
(74) *Attorney, Agent, or Firm* — Syncoda LLC; Feng Ma

(57) ABSTRACT

A method for controlling a network connection includes: detecting a type of a 5G resident network of the mobile terminal; determining whether the mobile terminal meets a data flow interruption condition; and performing an operation for making the mobile terminal change a 5G link mode according to the type of the 5G resident network, when the mobile terminal meets the data flow interruption condition. In the present disclosure, the operation for making the mobile terminal change the 5G link mode is performed according to the type of the 5G resident network, and when the mobile terminal meets the data flow interruption condition, the terminal can be changed from the current link to another link, which is a link to a different base station or a different network, thereby increasing the possibility of solving the problem of data flow interruption.

18 Claims, 3 Drawing Sheets

```
Detecting a type of a 5G resident network of the mobile     S11
terminal
        |
        v
Determining whether the mobile terminal meets a data        S12
flow interruption condition
        |
        v
Performing an operation for making the mobile
terminal change a 5G link mode according to the type        S13
of the 5G resident network, when the mobile terminal
meets the data flow interruption condition
```

(51) Int. Cl.
  *H04W 76/19* (2018.01)
  *H04W 24/06* (2009.01)

(56) References Cited

FOREIGN PATENT DOCUMENTS

| | | | |
|---|---|---|---|
| CN | 110944369 | A | 3/2020 |
| CN | 111342863 | A | 6/2020 |
| CN | 111417173 | A | 7/2020 |
| CN | 111770559 | A | 10/2020 |
| CN | 112004253 | A | 11/2020 |
| WO | 2016201904 | A1 | 12/2016 |
| WO | 2021052014 | A1 | 3/2021 |

OTHER PUBLICATIONS

Extended European Search Report in Application No. 21182726.6, dated Dec. 17, 2021.
Huawei, HiSilicon: Inter MN handover without SN change, 3GPP TSG-RAN WG2 #99bis, Prague, Czech, Oct. 9-13, 2017, R2-1710272.

* cited by examiner

METHOD, APPARATUS AND STORAGE MEDIUM FOR CONTROLLING NETWORK CONNECTION

CROSS-REFERENCE TO RELATED APPLICATIONS

This application claims priority to Chinese Patent Application No. 202110253136.3 filed on Mar. 3, 2021, the disclosure of which is hereby incorporated by reference in its entirety.

BACKGROUND

If too many terminals are accessing the same base station in the 5G network, network congestion may occur, resulting in that some of the terminals are unable to access the Internet or are experiencing a slow Internet access rate. In this case, the terminals that are unable to access the Internet or have a slow Internet access rate will try to re-establish the data link by restarting the data switch or restarting the modem subsystem etc., which, however, often cannot resolve the problem of being unable to access the Internet or experiencing a slow Internet access rate.

SUMMARY

The present disclosure relates generally to wireless network communication technologies, and more specifically to a method, apparatus and storage medium for controlling a network connection.

According to a first aspect of embodiments herein, there is provided method for controlling a network connection, applied to a mobile terminal, including:

detecting a type of a 5G resident network of the mobile terminal;

determining whether the mobile terminal meets a data flow interruption condition; and performing an operation for making the mobile terminal change a 5G link mode according to the type of the 5G resident network, when the mobile terminal meets the data flow interruption condition.

In an embodiment, the data flow interruption condition is at least one of the following conditions:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, where the second threshold is N times greater than the third threshold, and N is a real number greater than 1; and within the first set time length, the data amount sent is M times greater than the data amount received, wherein M is a real number greater than 1.

In an embodiment, the data flow interruption condition includes: a cell in which the mobile terminal resides is one of a set of data flow interruption cells received from a network side, or a base station in which the mobile terminal resides is one of a set of data flow interruption base stations received from the network side, wherein the set of data flow interruption cells is a set of data flow interruption cells reported by a plurality of mobile terminals, and the set of data flow interruption base stations is a set of data flow interruption base stations reported by the plurality of mobile terminals, and a condition for reporting the data flow interruption cell or the data flow interruption base station by the mobile terminal is at least one of the following conditions:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, wherein the second threshold is N times greater than the third threshold, and N is a real number greater than 1; and within the first set time length, the data amount sent is M times greater than the data amount received, wherein M is a real number greater than 1.

In an embodiment, the type of the 5G resident network is a non-standalone network, and the performing the operation for making the mobile terminal change the 5G link mode includes:

sending simulated data packets with a gradually increased data flow amount within a second set time length, when no secondary cell is added to the mobile terminal.

In an embodiment, the performing the operation for making the mobile terminal change the 5G link mode further includes:

sending the simulated data packets with the gradually increased data flow amount within the second set time length, after the secondary cell is added and released;

detecting whether the data flow amount of the sent data packets is less than a set threshold, after the second set time length elapses, and sending the simulated data packets with a fixed data flow amount if the data flow amount of the sent data packets is less than the set threshold.

In an embodiment, the method further includes:

determining whether the mobile terminal meets the data flow interruption condition after performing the operation for enabling the mobile terminal to change the 5G link mode; and enabling a function of accessing a standalone network of the mobile terminal when the mobile terminal meets the data flow interruption condition and the function of accessing the standalone network of the mobile terminal is not enabled.

In an embodiment, the type of the 5G resident network is the non-standalone network, and the performing the operation for making the mobile terminal change the 5G link mode further includes:

disabling a dual link function when a secondary cell is added to the mobile terminal.

In an embodiment, the type of the 5G resident network is a standalone network, and the performing the operation for making the mobile terminal change the 5G link mode further includes:

disabling an ability of connecting to the standalone network, or enabling a function of searching for a non-standalone network, or enabling a function of searching for a 4G network.

According to a second aspect of embodiments herein, there is provided an apparatus for controlling a network connection, including:

a detection module, configured to detect a type of a 5G resident network of a mobile terminal;

a determination module, configured to determine whether the mobile terminal meets a data flow interruption condition; and an execution module, configured to perform an operation for making the mobile terminal change a 5G link mode according to the type of the 5G resident network, when the mobile terminal meets the data flow interruption condition.

In an embodiment, the data flow interruption condition is at least one of the following conditions:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, wherein the second threshold is N times greater than the third threshold, and N is a real number greater than 1; and within the first set time length, the data amount sent is M times greater than the data amount received, wherein M is a real number greater than 1.

In an embodiment, the data flow interruption condition includes: a cell in which the mobile terminal resides is one of a set of data flow interruption cells received from a network side, or a base station in which the mobile terminal resides is one of a set of data flow interruption base stations received from the network side, wherein the set of data flow interruption cells is a set of data flow interruption cells reported by a plurality of mobile terminals, and the set of data flow interruption base stations is a set of data flow interruption base stations reported by the plurality of mobile terminals, and a condition for reporting the data flow interruption cell or the data flow interruption base station by the mobile terminal is at least one of the following conditions:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, wherein the second threshold is N times greater than the third threshold, and N is a real number greater than 1; and within the first set time length, the data amount sent is M times greater than the data amount received, wherein M is a real number greater than 1.

In an embodiment, the execution module is configured to, when the type of the 5G resident network is a non-standalone network, perform the operation for making the mobile terminal change the 5G link mode by adopting the following method: sending simulated data packets with a gradually increased data flow amount within a second set time length when no secondary cell is added to the mobile terminal.

In an embodiment, the execution module is further configured to send the simulated data packets with the gradually increased data flow amount within the second set time length after the secondary cell is added and released, detect whether the data flow amount of the sent data packets is less than a set threshold after the second set time length elapses, and send the simulated data packets with a fixed data flow amount if the data flow amount of the sent data packets is less than the set threshold.

In an embodiment, the apparatus further includes:

a determination module, configured to determine whether the mobile terminal meets the data flow interruption condition after the operation for making the mobile terminal change the 5G link mode is performed; and a control module, configured to enable a function of accessing a standalone network of the mobile terminal when the mobile terminal meets the data flow interruption condition and the function of accessing the standalone network of the mobile terminal is not enabled.

In an embodiment, the execution module is configured to, when the type of the 5G resident network is a non-standalone network, perform the operation for enabling the mobile terminal to change the 5G link mode by adopting the following method: disabling a dual link function when the secondary cell is added to the mobile terminal.

In an embodiment, the execution module is configured to, when the type of the 5G resident network is a standalone network, perform the operation for making the mobile terminal change the 5G link mode by adopting the following method: disabling an ability of connecting to the standalone network, or enabling a function of searching for a non-standalone network, or enabling a function of searching for a 4G network.

According to a third aspect of embodiments herein, there is provided an apparatus for controlling a network connection, including:

a processor; and a memory for storing instructions executable by the processor, wherein the processor is configured to execute the executable instructions in the memory to implement the steps of the above-mentioned methods.

According to a third aspect of embodiments herein, there is provided a non-transitory computer readable storage medium, having stored therein instructions that, when executed by a processor, implement the steps of the above-mentioned methods.

The technical solutions provided by the embodiments of the present disclosure may have the following beneficial effects: the operation for making the mobile terminal change the 5G link mode is carried out according to the type of the 5G resident network, and when the mobile terminal meets the data flow interruption condition, the terminal can be changed from the current link to another link, which is a link to a different base station in the same network or a link to a different network, thereby increasing the possibility of solving the problem of data flow interruption.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute part of this disclosure, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as detailed in the appended claims.

Figure 1:
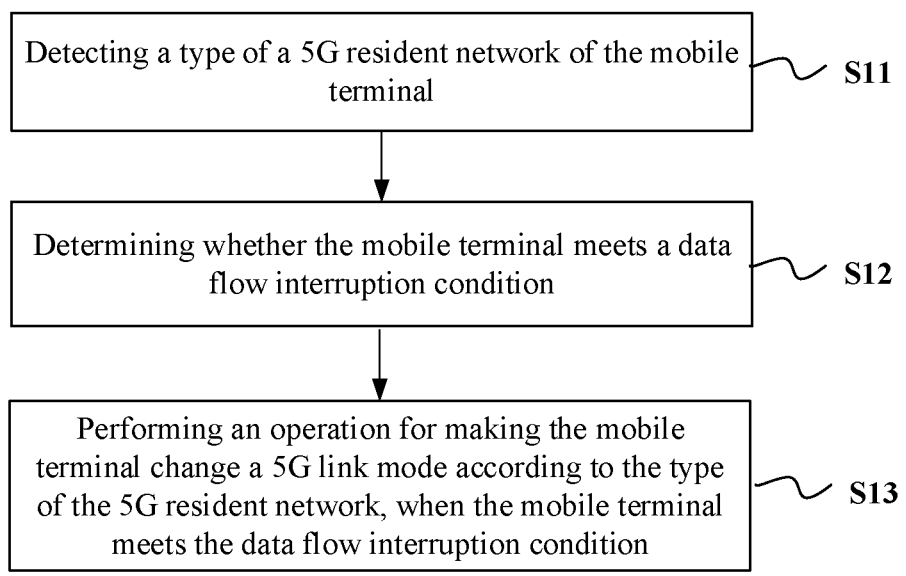
FIG. 1 is a flow chart showing a method for controlling a network connection according to an exemplary embodiment.

An embodiment of the present disclosure provides a method for controlling a network connection. Referring to FIG. 1, FIG. 1 is a flow chart showing a method for controlling a network connection according to an exemplary embodiment. As shown in FIG. 1, the method includes:

In step S11, a type of a 5G resident network of a mobile terminal is detected.

In step S12, it is determined whether the mobile terminal meets a data flow interruption condition.

In step S13, an operation for making the mobile terminal change a 5G link mode is performed according to the type of the 5G resident network, when the mobile terminal meets the data flow interruption condition.

The type of the 5G resident network in step S11 includes non-standalone network (NSA) and standalone network (SA). In the 5G network of the NSA type, the terminal can use the 5G network for data transmission only after a secondary cell group (SCG) is added.

An attempt will be made to establish a data link after a terminal device turns on a "mobile data" switch in the 5G network function, and when the data link has been successfully established, various software programs installed on the terminal can use 5G mobile data flow amount normally.

In the embodiment, the operation for making the mobile terminal change the 5G link mode is performed according to the type of the 5G resident network. When the mobile terminal meets the data flow interruption condition, the terminal can be changed from the current link to another link, which is a link to a different base station in the same network or a link to a different network, thereby increasing the possibility of solving the problem of data flow interruption.

In an implementation, the data flow interruption condition in step S12 is at least one of the following conditions:

First, within a first set time length, the data amount sent is greater than 0, and the data amount received is 0, wherein a measurement unit of the data amount is bit, byte, kilobit (Kb), megabit (Mb), etc.

Second, within the first set time length, the data amount sent is greater than a first threshold, and the data amount received is less than the first threshold.

Third, within the first set time length, the data amount sent is greater than a second threshold, and the data amount received is less than a third threshold, wherein the second threshold is N times greater than the third threshold, and N is a real number greater than 1.

Fourth, within the first set time length, the data amount sent is M times greater than the data amount received, wherein M is a real number greater than 1.

For example, in the first condition, the first set time length is 30 seconds, and the data amount sent is 200 megabits and the data amount received is 0 within 30 seconds.

In the second condition, the first set time length is 30 seconds. Within 30 seconds, the data amount sent is 200 megabits which greater than the first threshold of 30 megabits, and the data amount received is 10 megabits which is less than the first threshold of 30 megabits.

In the third condition, the first set time length is 30 seconds, and N is 10. Within 30 seconds, the data amount sent is 200 megabits which is greater than the second threshold of 100 megabits, and the data amount received is 5 megabits which is less than the third threshold of 9 megabits, wherein the second threshold is 10 times greater than the third threshold.

In the fourth condition, the first set time length is 30 seconds, and M is 30. Within 30 seconds, the data amount sent is 200 megabits, and the data amount received is 5 megabits, wherein the data amount sent is 30 times greater than the data amount received.

In the method, a data amount statistic unit may be provided to determine whether the data flow interruption condition is met. For example, in the above-mentioned data flow interruption conditions, if the data amount sent is greater than 0 but the data amount received is always 0 within the first set time length, or, if the data amount sent is greater than the data amount received within the first set time length, it indicates that the terminal fails to receive a response to a data packets that are sent or has not received all of the responses, thus it is determined that the data flow interruption occurred.

The data amount statistic unit regularly detects whether the above conditions are met, such as doing a detection every 20 seconds.

In an implementation, the data flow interruption condition in step S12 includes: a cell in which the mobile terminal resides is one of a set of data flow interruption cells received from the network side; or, a base station in which the mobile terminal resides is one of a set of data flow interruption base stations received from the network side.

The set of data flow interruption cells is a set of data flow interruption cells reported by a plurality of mobile terminals. When the mobile terminal determines that the current resident cell meets a condition for reporting the data flow interruption cell, the mobile terminal reports to the network side the cell in which it currently resides. The network side counts the data flow interruption cells reported by the plurality of mobile terminals and then creates a set of data flow interruption cells.

The set of data flow interruption base stations is a set of data flow interruption base stations reported by multiple mobile terminals. When the mobile terminal determines that the current resident base station meets a condition for reporting the data flow interruption base station, the mobile terminal reports to the network side the base station in which it currently resides. The network side counts the data flow interruption base stations reported by the mobile terminals and then creates a set of data flow interruption base stations.

When a large number of mobile terminals all report the data flow interruption cells and/or the data flow interruption base stations, a server on the network side will have a more comprehensive and accurate statistic of the data flow interruption cells and/or the data flow interruption base stations.

The condition for reporting the data flow interruption cells or the data flow interruption base stations by the mobile terminal is at least one of the following conditions:

First, within the first set time length, the data amount sent is greater than 0, and the data amount received is 0, wherein a measurement unit of the data amount is bite, byte, kilobit (Kb), megabit (Mb), etc.

Second, within the first set time length, the data amount sent is greater than a first threshold, and the data amount received is less than the first threshold.

Third, within the first set time length, the data amount sent is greater than a second threshold, and the data amount received is less than a third threshold, wherein the second threshold is N times greater than the third threshold, and N is a real number greater than 1.

Fourth, within the first set time length, the data amount sent is M times greater than the data amount received, wherein M is a real number greater than 1.

In an embodiment, a threshold of the number of times is set to be greater than 1, e.g., 10 times. When any of the first to fourth conditions is met for 10 consecutive times, the data flow interruption is considered severe.

An embodiment of the present disclosure provides a method for controlling a network connection. The method includes the method shown in FIG. 1, wherein the type of the 5G resident network is the non-standalone network type, wherein:

performing the operation for making the mobile terminal change the 5G link mode includes: sending simulated data packets with a gradually increased data flow amount within a second set time length, when no secondary cell group is added to the mobile terminal.

The simulated data packets sent in this method are data packets only for simulation, not for handling any services, and may be data packets of the same content.

In an embodiment, the method further includes: counting an average sending data flow amount of the mobile terminal during a set historical period of time (e.g. a day), wherein the gradually increased data flow amount means being gradually increased from a reference data flow amount, and the reference data flow amount is equal to or greater than the average sending data flow amount. The increment for gradually increasing is greater than a set value, for example, the data amount sent for the first time is 5 megabits, the data amount sent for the second time is 10 megabits, and the data amount sent for the third time is 20 megabits.

The second set time length is related to a home service provider of the 5G resident network, when the home service providers of the 5G resident networks are different, the corresponding second set time lengths are different. For example, the second set time length is 20 seconds when the home service provider of the 5G resident network is a first service provider, and the second set time length is 40 seconds when the home service provider of the 5G resident network is a second service provider.

In this embodiment, the data flow interruption is generated in the NSA network, which indicates that no EN-DC dual link is established in the current network. At this time, an attempt will be made to add a SCG cell by the network so as to establish the dual link, such that the terminal can use both 4G and 5G networks at the same time. By sending data packets with a gradually increased data flow amount, the network of the service provider recognizes that a larger data amount needs to be transmitted and received by the current terminal, then it may establish a SCG cell for the terminal, so that the terminal can establish the EN-DC dual link and use both the 4G and 5G networks to transmit the data packets simultaneously. At this time, the terminal need not only transmit data in the 4G network, but also can transmit data in both the 4G and 5G networks.

In an embodiment, the type of the 5G resident network is the non-standalone network, and performing the operation for making the mobile terminal change the 5G link mode includes: after adding a secondary cell and releasing the secondary cell, sending simulated data packets with a gradually increased data flow amount within the second set time length, detecting whether the data flow amount of the sent data packets is less than a set threshold after the second set time length elapses, and, if it is, sending simulated data packets with a fixed data flow amount.

This fixed data flow amount is greater than the above-described average sending data flow amount.

In this embodiment, when it is detected that the data flow amount of the sent data packets is less than the set threshold (e.g. 10 megabits/second) after the second set time length elapses, the network may consider that the data amount of the terminal is too small and then release the SCG cell, so the simulated data packet of a fixed data flow amount is required to be sent, which ensures that the terminal maintains at a high data flow amount level for a long time and the network does not easily release the SCG cell.

An embodiment of the present disclosure provides a method for controlling a network connection. The method includes the method shown in FIG. 1, wherein the type of the 5G resident network is the non-standalone network. After step S13, i.e., after performing the operation for making the mobile terminal to change the 5G link mode, it is determined whether the mobile terminal meets the data flow interruption condition. When the mobile terminal meets the data flow interruption condition and a function of accessing the standalone network, of the mobile terminal, is not turned on, the mobile terminal turns on the function of accessing the standalone network.

In this embodiment, after the step S13 is performed, when the terminal is still kept in the state of the data flow interruption, it will read whether the terminal enables SA capability at present, and will call a system interface to enable the SA capability if the SA capability is not enabled, so as to try to let the network search for a SA network to allow the mobile terminal to access the SA network and use the standalone 5G network, which may avoid the data flow interruption as well.

An embodiment of the present disclosure provides a method for controlling a network connection. The method includes the method shown in FIG. 1, wherein the type of the 5G resident network is a non-standalone network, and performing the operation for making the mobile terminal to change the 5G link mode includes: disabling the dual link function when a secondary cell is added to the mobile terminal.

In this embodiment, if a SCG cell is added, it means that the EN-DC dual link is established by the current network. If continuous data flow interruption still occurs under the EN-DC dual link, there may be a problem with the dual link, so the EN-DC dual link of the terminal is turned off. At this time, the network will release the SCG cell and disconnect the EN-DC dual link. At this time, the terminal only uses the 4G network and tries to transmit and receive data packets in the 4G network.

An embodiment of the present disclosure provides a method for controlling a network connection. The method includes the method shown in FIG. 1, wherein the type of the 5G resident network is a standalone network, and performing the operation to change the 5G link mode of the mobile terminal includes: disabling the ability to connect to a standalone network, or enabling the function of searching for a non-standalone network, or enabling a function of searching for a 4G network.

In this embodiment, when the resident network of the terminal is the standalone network, the ability to connect to the standalone network is disabled, or the function of searching for non-standalone networks is enabled, or the function of searching for 4G networks is enabled, such that the terminal attempts to let the network search for an NSA, or long time evolution (LTE) network, so as to make the terminal access the non-standalone network or the 4G network with normal data transmission and reception.

Figure 2:
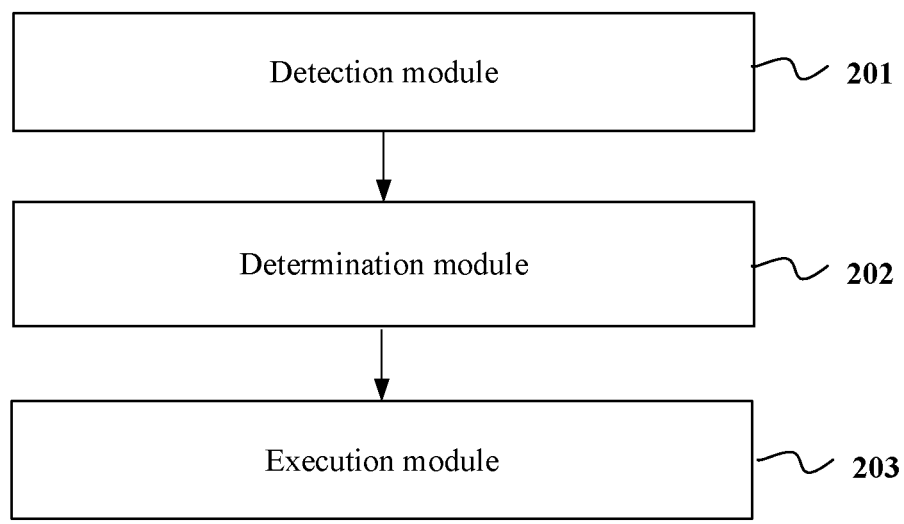
FIG. 2 is a structural diagram illustrating an apparatus for controlling a network connection according to an exemplary embodiment.

An embodiment of the present disclosure provides an apparatus for controlling a network connection. Referring to FIG. 2, FIG. 2 is a structural diagram showing an apparatus for controlling a network connection according to an exemplary embodiment. As shown in FIG. 2, the device includes:

a detection module 201, configured to detect a type of a 5G resident network of a mobile terminal;

a determination module 202, configured to determine whether the mobile terminal meets a data flow interruption condition; and an execution module 203, configured to perform an operation for making the mobile terminal change a 5G link mode according to the type of the 5G resident network, when the mobile terminal meets the data flow interruption condition.

In an implementation, the data flow interruption condition is at least one of the following conditions, wherein a measurement unit of a data amount is bit, byte, kilobit (Kb), megabit (Mb), etc.:

first, within a first set time length, a data amount sent is greater than 0, and a data amount received is 0;

second, within the first set time length, the data amount sent is greater than a first threshold, and the data amount received is less than the first threshold;

third, within the first set time length, the data amount sent is greater than a second threshold, and the data amount received is less than a third threshold, wherein the second threshold is N times greater than the third threshold, and N is a real number greater than 1; and fourth, within the first set time length, the data amount sent is M times greater than the data amount received, wherein M is a real number greater than 1.

In an embodiment, the data flow interruption condition includes: a cell in which the mobile terminal resides is one of a set of data flow interruption cells received from the network side; or a base station in which the mobile terminal resides is one of a set of data flow interruption base stations received from the network side;

wherein the set of data flow interruption cells is a set of data flow interruption cells reported by multiple mobile terminals; and the set of data flow interruption base stations is a set of data flow interruption base stations reported by multiple mobile terminals; and the condition for reporting the data flow interruption cell or the data flow interruption base station by the mobile terminal is at least one of the following conditions, wherein a measurement unit of the data amount is bite, byte, kilobit (Kb), megabit (Mb), etc:

first, within the first set time length, the data amount sent is greater than 0, and the data amount received is 0;

second, within the first set time length, the data amount sent is greater than a first threshold, and the data amount received is less than the first threshold;

third, within the first set time length, the data amount sent is greater than a second threshold, and the data amount received is less than a third threshold, wherein the second threshold is N times greater than the third threshold, and N is a real number greater than 1; and fourth, within the first set time length, the data amount sent is M times greater than the data amount received, wherein M is a real number greater than 1.

An embodiment of the present disclosure provides an apparatus for controlling a network connection. The apparatus includes the apparatus shown in FIG. 2, wherein the execution module 203 is configured to, when the type of the 5G resident network is a non-standalone network, perform the operation for making the mobile terminal change the 5G link mode by adopting the following method: sending simulated data packets with a gradually increased data flow amount within a second set time length, when no secondary cell is added to the mobile terminal.

An embodiment of the present disclosure provides an apparatus for controlling a network connection. The apparatus includes the apparatus shown in FIG. 2, wherein the execution module 203 is further configured to, after adding the secondary cell and releasing the secondary cell, send simulated data packets with a gradually increased data flow amount within the second set time length, detect whether the data flow amount of the sent data packets is less than a set threshold after the second set time length elapses; and if it is, send the simulated data packets with a fixed data flow amount.

An embodiment of the present disclosure provides an apparatus for controlling a network connection. The apparatus includes the apparatus shown in FIG. 2, wherein the apparatus further includes:

a determination module, configured to determine whether the mobile terminal meets the data flow interruption condition, after the operation for making the mobile terminal change the 5G link mode is performed; and a control module, configured to enable a function of accessing a standalone network, of the mobile terminal, when the mobile terminal meets the data flow interruption condition and the mobile terminal does not enable the function of accessing the standalone network.

An embodiment of the present disclosure provides an apparatus for controlling a network connection. The apparatus includes the apparatus shown in FIG. 2, wherein the execution module 203 is further configured to, when the type of the 5G resident network is the non-standalone network, perform the operation for enabling the mobile terminal to change the 5G link mode by adopting the following method: disabling a dual link function when the secondary cell is added to the mobile terminal.

An embodiment of the present disclosure provides an apparatus for controlling a network connection. The apparatus includes the apparatus shown in FIG. 2, wherein the execution module 203 is further configured to, when the type of the 5G resident network is the standalone network, perform the operation for making the mobile terminal change the 5G link mode by adopting the following method: disabling the ability to connect to the standalone network, or enabling the function of searching for the non-standalone network, or enabling the function of searching for a 4G network.

An embodiment of the present disclosure provides an apparatus for controlling a network connection, and the apparatus includes:

a processor; and a memory for storing instructions executable by the processor, wherein the processor is configured to execute possible instructions in the memory to implement the steps of the method described above.

The embodiments of the present disclosure provide a non-transitory computer readable storage medium having instructions stored therein, when executed by a processor, implement the steps of the method described above.

Figure 3:
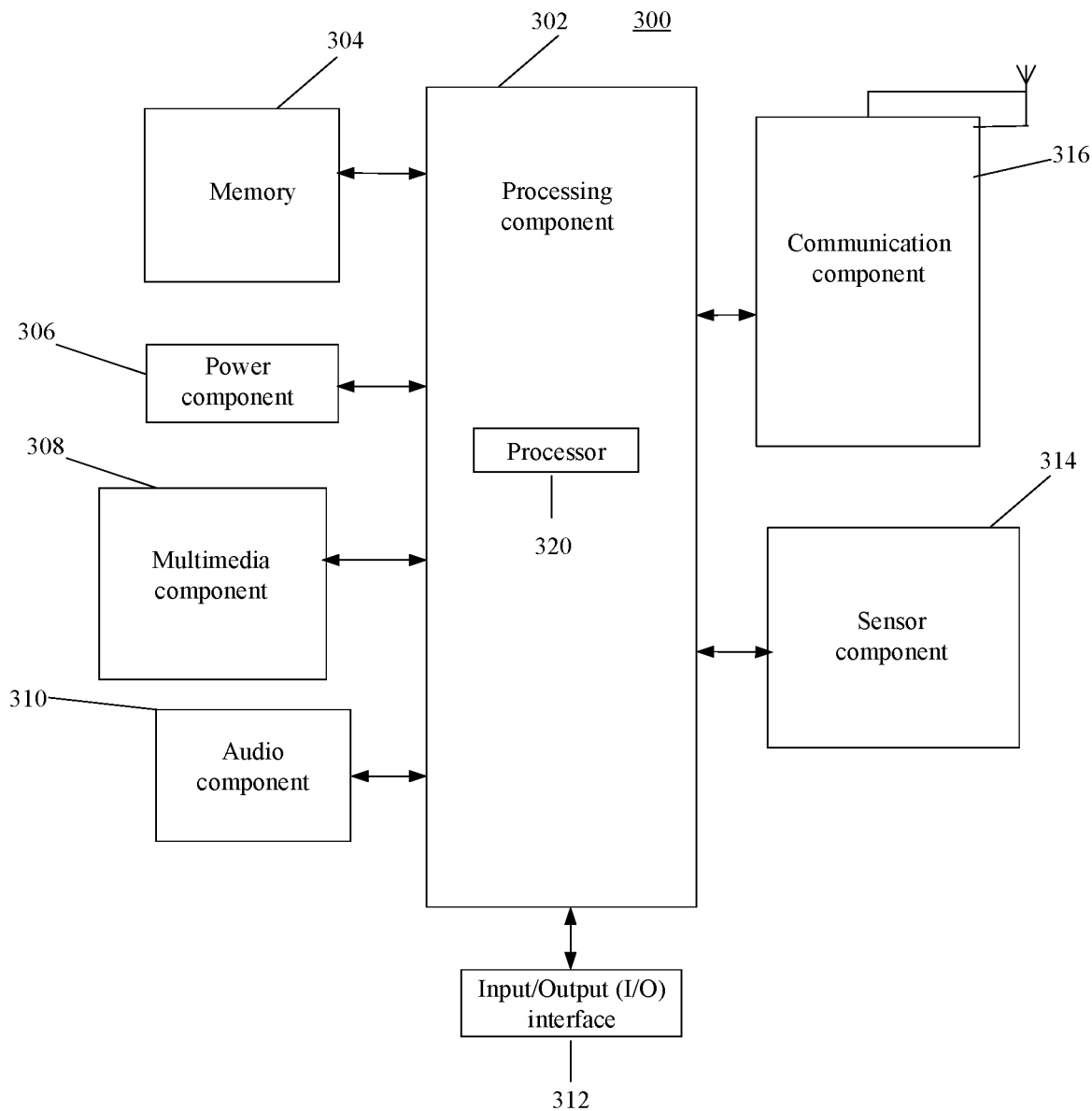
FIG. 3 is a structural diagram illustrating an apparatus for controlling a network connection according to an exemplary embodiment.

FIG. 3 is a block diagram illustrating a device 300 for controlling a network connection according to an exemplary embodiment. For example, the device 300 may be a mobile phone, a computer, a digital broadcast terminal, a messaging device, a gaming console, a tablet, a medical device, exercise equipment, a personal digital assistant, etc.

Referring to FIG. 3, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as operations associated with display, telephone calls, data communications, camera operations, and recording operations. The processing component 302 may include one or more processors 320 to execute instructions to perform all or part of the steps in the above described methods. Additionally, the processing component 302 may include one or more modules which facilitate the interaction between the processing component 302 and other components. For example, the processing component 302 may include a multimedia module to facilitate the interaction between the multimedia component 305 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or optical disk.

The power component 306 provides power to various components of the device 300. The power component 306 may include a power management system, one or more power sources, and other components associated with generating, managing, and distributing power in the device 300.

The multimedia component 305 includes a screen that provides an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 305 includes a front camera and/or a rear camera. When the device 300 is in an operation mode, such as a photographing mode or a video mode, the front camera and/or the rear camera may receive external multimedia data. Each front camera and rear camera may be a fixed optical lens system or have focus and optical zoom capabilities.

The audio component 310 is configured to output and/or input audio signals. For example, the audio component 310 includes a microphone ("MIC"), and when the device 300 is in an operation mode, such as a call mode, a recording mode, an a voice recognition mode, the microphone is configured to receive external audio signals. The received audio signal can be further stored in the memory 304 or transmitted via the communication component 316. In some embodiments, the audio component 310 further includes a speaker to output audio signals.

The I/O interface 312 provides an interface between the processing component 302 and a peripheral interface module, such as a keyboard, a click wheel, buttons, etc. The buttons may include, but are not limited to, a home button, a volume button, a start button, and a lock button.

The sensor component 314 includes one or more sensors to provide status assessments of various aspects of the device 300. For instance, the sensor component 314 may detect the on/off status of the device 300, relative positioning of components, e.g., the display and the keypad of the device 300, a change in position of the device 300 or a component of the device 300, the presence or absence of user contact with the device 300, an orientation or an acceleration/deceleration of the device 300, and a change in temperature of the device 300. The sensor component 314 may include a proximity sensor configured to detect the presence of nearby objects without physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wireless, between the device 300 and other devices. The device 300 can access a wireless network based on a communication standard, such as WiFi, 2G, 3G, 4G or 5G, or a combination thereof. In an exemplary embodiment, the communication component 316 receives a broadcast signal or broadcast associated information from an external broadcast management system via a broadcast channel. In an exemplary embodiment, the communication component 316 further includes a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, etc.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HIVID) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for controlling a network connection, applied to a mobile terminal, comprising:
   detecting a type of a 5G resident network of the mobile terminal;
   determining whether the mobile terminal meets a data flow interruption condition; and
   performing an operation for making the mobile terminal change a 5G link mode according to the type of the 5G resident network, when the mobile terminal meets the data flow interruption condition;

wherein the data flow interruption condition comprises: a cell in which the mobile terminal resides is one of a set of data flow interruption cells received from a network side, or a base station in which the mobile terminal resides is one of a set of data flow interruption base stations received from the network side, wherein the set of data flow interruption cells is a set of data flow interruption cells reported by a plurality of mobile terminals, and the set of data flow interruption base stations is a set of data flow interruption base stations reported by the plurality of mobile terminals.

2. The method of claim 1, wherein a condition for reporting the data flow interruption cell or the data flow interruption base station by the mobile terminal comprises at least one of:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, wherein the second threshold is N times greater than the third threshold, and N is a real number greater than 1; and within the first set time length, the data amount sent is M times greater than the data amount received, wherein M is a real number greater than 1.

3. The method of claim 1, wherein the type of the 5G resident network is a non-standalone network, and the performing the operation for making the mobile terminal change the 5G link mode comprises:

sending simulated data packets with a gradually increased data flow amount within a second set time length, when no secondary cell is added to the mobile terminal.

4. The method of claim 3, wherein the performing the operation for making the mobile terminal change the 5G link mode further comprises:

sending the simulated data packets with the gradually increased data flow amount within the second set time length, after the secondary cell is added and released;

detecting whether the data flow amount of the sent data packets is less than a set threshold, after the second set time length elapses, and sending the simulated data packets with a fixed data flow amount if the data flow amount of the sent data packets is less than the set threshold.

5. The method of claim 3, further comprising:

determining whether the mobile terminal meets the data flow interruption condition after performing the operation for enabling the mobile terminal to change the 5G link mode; and enabling a function of accessing a standalone network, of the mobile terminal, when the mobile terminal meets the data flow interruption condition and the mobile terminal does not enable the function of accessing the standalone network.

6. The method of claim 4, further comprising:

determining whether the mobile terminal meets the data flow interruption condition after performing the operation for enabling the mobile terminal to change the 5G link mode; and enabling a function of accessing a standalone network, of the mobile terminal, when the mobile terminal meets the data flow interruption condition and the mobile terminal does not enable the function of accessing the standalone network.

7. The method of claim 1, wherein the type of the 5G resident network is the non-standalone network, and the performing the operation for making the mobile terminal change the 5G link mode further comprises:

disabling a dual link function when a secondary cell is added to the mobile terminal.

8. The method of claim 1, wherein the type of the 5G resident network is a standalone network, and the performing the operation for making the mobile terminal change the 5G link mode further comprises:

disabling an ability of connecting to the standalone network, or enabling a function of searching for a non-standalone network, or enabling a function of searching for a 4G network.

9. An apparatus for controlling a network connection, applied to a mobile terminal, comprising:

a processor; and memory for storing instructions executable by the processor, wherein the processor is configured to:

detect a type of a 5G resident network of a mobile terminal;

determine whether the mobile terminal meets a data flow interruption condition; and perform an operation for making the mobile terminal change a 5G link mode according to the type of the 5G resident network, when the mobile terminal meets the data flow interruption condition, wherein the data flow interruption condition comprises: a cell in which the mobile terminal resides is one of a set of data flow interruption cells received from a network side, or a base station in which the mobile terminal resides is one of a set of data flow interruption base stations received from the network side, wherein the set of data flow interruption cells is a set of data flow interruption cells reported by a plurality of mobile terminals, and the set of data flow interruption base stations is a set of data flow interruption base stations reported by the plurality of mobile terminals.

10. The apparatus of claim 9, wherein a condition for reporting the data flow interruption cell or the data flow interruption base station by the mobile terminal comprises at least one of:

within a first set time length, a data amount sent is greater than 0, and a data amount received is 0;

within the first set time length, the data amount sent is greater than a first threshold, and the data amount received is less than the first threshold;

within the first set time length, the data amount sent is greater than a second threshold, and the data amount received is less than a third threshold, wherein the second threshold is N times greater than the third threshold, and N is a real number greater than 1; and within the first set time length, the data amount sent is M times greater than the data amount received, wherein M is a real number greater than 1.

11. The apparatus of claim 9, wherein the processor is further configured to, when the type of the 5G resident network is a non-standalone network, perform the operation for making the mobile terminal change the 5G link mode by adopting: sending simulated data packets with a gradually increased data flow amount within a second set time length when no secondary cell is added to the mobile terminal.

12. The apparatus of claim 11, wherein
the processor is further configured to send the simulated data packets with the gradually increased data flow amount within the second set time length after the secondary cell is added and released, detect whether the data flow amount of the sent data packets is less than a set threshold after the second set time length elapses, and send the simulated data packets with a fixed data flow amount if the data flow amount of the sent data packets is less than the set threshold.

13. The apparatus of claim 11, wherein the processor is further configured to:
determine whether the mobile terminal meets the data flow interruption condition after the operation for making the mobile terminal change the 5G link mode is performed; and
enable a function of accessing a standalone network, of the mobile terminal, when the mobile terminal meets the data flow interruption condition and the mobile terminal does not enable the function of accessing the standalone network.

14. The apparatus of claim 12, wherein the processor is further configured to:
determine whether the mobile terminal meets the data flow interruption condition after the operation for making the mobile terminal change the 5G link mode is performed; and
enable a function of accessing a standalone network, of the mobile terminal, when the mobile terminal meets the data flow interruption condition and the mobile terminal does not enable the function of accessing the standalone network.

15. The apparatus of claim 9, wherein the processor is further configured to:
when the type of the 5G resident network is a non-standalone network, perform the operation for enabling the mobile terminal to change the 5G link mode by adopting: disabling a dual link function when the secondary cell is added to the mobile terminal.

16. The apparatus of claim 9, wherein the processor is further configured to:
when the type of the 5G resident network is a standalone network, perform the operation for making the mobile terminal change the 5G link mode by adopting: disabling an ability of connecting to the standalone network, or enabling a function of searching for a non-standalone network, or enabling a function of searching for a 4G network.

17. A non-transitory computer readable storage medium, having stored therein instructions that, when executed by a processor, implement operations of:
detecting a type of a 5G resident network of a mobile terminal;
determining whether the mobile terminal meets a data flow interruption condition; and
performing an operation for making the mobile terminal change a 5G link mode according to the type of the 5G resident network, when the mobile terminal meets the data flow interruption condition;
wherein the data flow interruption condition comprises: a cell in which the mobile terminal resides is one of a set of data flow interruption cells received from a network side, or a base station in which the mobile terminal resides is one of a set of data flow interruption base stations received from the network side, wherein
the set of data flow interruption cells is a set of data flow interruption cells reported by a plurality of mobile terminals, and the set of data flow interruption base stations is a set of data flow interruption base stations reported by the plurality of mobile terminals.

18. The non-transitory computer readable storage medium of claim 17, wherein
a condition for reporting the data flow interruption cell or the data flow interruption base station by the mobile terminal comprises at least one of:
within a first set time length, a data amount sent is greater than 0, and a data amount received is 0;
within the first set time length, the data amount sent is greater than a first threshold, and the data amount received is less than the first threshold;
within the first set time length, the data amount sent is greater than a second threshold, and the data amount received is less than a third threshold, where the second threshold is N times greater than the third threshold, and N is a real number greater than 1; and
within the first set time length, the data amount sent is M times greater than the data amount received, wherein M is a real number greater than 1;
and wherein said performing an operation for making the mobile terminal change a 5G link mode according to the type of the 5G resident network comprises making the mobile terminal change from a current link to another link that is a link to a different base station in a same network or a link to a different network, thereby avoiding data flow interruption.

\* \* \* \* \*